United States Patent [19]

McGill et al.

[11] 4,009,753
[45] Mar. 1, 1977

[54] SUBSEA MASTER VALVE APPARATUS

[75] Inventors: Howard L. McGill, Houston; Ervin Randermann, Jr., Beasley; Olgierd J. Musik, Houston, all of Tex.

[73] Assignee: Schlumberger Technology Corporation, New York, N.Y.

[22] Filed: Mar. 22, 1976

[21] Appl. No.: 669,128

[52] U.S. Cl. .............................. 166/55.1; 166/319; 166/298; 251/58
[51] Int. Cl.² ........................................ E21B 29/00
[58] Field of Search .......... 166/55, 55.1, 298, 224; 251/58

[56] References Cited

UNITED STATES PATENTS

| | | | |
|---|---|---|---|
| 2,969,838 | 1/1961 | Wilde | 166/55 |
| 3,233,860 | 2/1966 | Dollison et al. | 251/58 |
| 3,561,526 | 2/1971 | Williams, Jr. et al. | 166/55 |
| 3,766,978 | 10/1973 | Orund et al. | 166/55 |
| 3,786,865 | 1/1974 | Tausch et al. | 251/58 |
| 3,946,806 | 3/1976 | Meynier | 166/55 |

*Primary Examiner*—James A. Leppink
*Attorney, Agent, or Firm*—David L. Moseley; William R. Sherman; Stewart F. Moore

[57] ABSTRACT

A control valve apparatus adapted to be positioned within a subsea blowout preventer stack for controlling the flow of fluid from an offshore well includes a ball valve element provided with the capability of cutting coil tubing typically employed in well workover and completion operations. The ball element has a cutting edge that coacts with the valve seat to shear the tubing, and a relief slot that receives the tubing during cutting to prevent the tubing from being placed in double shear. Hydraulically operable means is provided to assist in closure of the ball valve element and consequent cutting of tubing extending into the well, in case of emergency.

16 Claims, 8 Drawing Figures

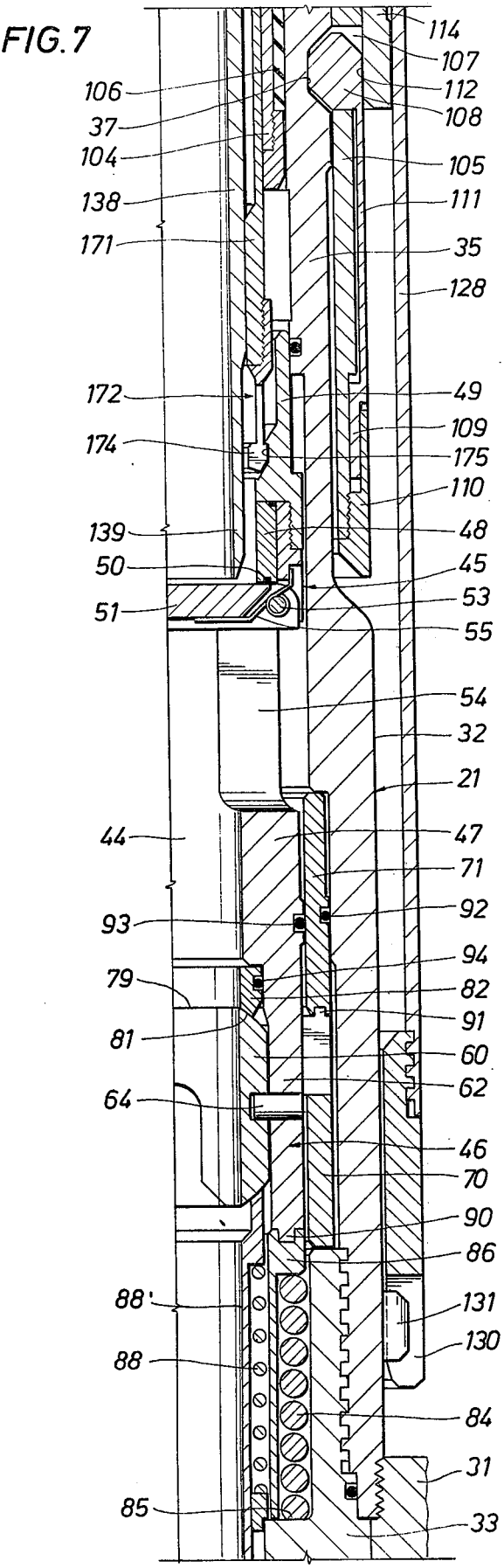

SUBSEA MASTER VALVE APPARATUS

This invention relates to a new and improved subsea control or master valve apparatus having a valve element that can be used in an emergency to cut coiled tubing extending into the well.

In many offshore well testing and workover operations conducted from floating vessels and supports, a subsea blowout preventer stack is employed together with a control valve apparatus that is positioned therein to provide for complete control of the well. The master valve controls fluid communication through a production string of tubing extending into the well, and the rams of the blowout preventer are closed off against the tubing to control flow from the annulus. The riser pipe and pipe string extending from the vessel down to the stack and master valve, respectively, can be disconnected in case of emergency, leaving the well shut-in. In accordance with the teachings of U.S. Application Ser. No. 462,829, Young, assigned to the assignee of this invention, the master valve preferably includes a ball valve element with hydraulically assisted closing that can be operated to cut wireline or cable that may be extending into the well, in the event an emergency situation arises where there is insufficient time to retrieve wireline tools prior to disconnection.

To perform various workover operations in an offshore well under the conditions described above, it is becoming more and more common to use what are known as "coiled tubing" units. Such units comprise a long section of continuous tubing that is wound on a reel on the vessel and forced into the production string by a tubing injector. The tubing is usually a relatively small diameter (i.e., ¾ to 1 inch o.d.) line made of a soft steel, and when extended down inside the production string of tubing, enables various services such as sand washing, fluid circulation, well kick-off, zone treatment and paraffin removal to be performed in a relatively fast time. Of course while such services are underway the coiled tubing extends down through the subsea master valve and will prohibit closing of a valve of conventional design in case an emergency disconnection becomes imperative.

It is an object of the present invention to provide a new and improved subsea master valve apparatus having a rotatable valve element that can be used to cut off coiled tubing or the like extending into a well in case of emergency, and then shut off the production pipe leading from the well.

This and other objects are attained in accordance with the present invention through the provision of a subsea master valve apparatus including a tubular valve body having a flow passage and a rotatable valve element, such as a ball valve, movable between positions opening and closing the flow passage. Preferably, the valve has a "fail-close" design with a spring loaded actuator that normally positions the valve in closed condition, with hydraulically operable piston and cylinder means for maintaining the valve open in response to the pressure of a control fluid in a line leading upwardly to a control system onboard the vessel. The ball valve element has a throughbore that is aligned with the flow passage in the open position, and an external spherical surface that engages a companion valve seat that surrounds the flow passage in the closed position. A cutting means is provided on the lip of the ball that leads in closing off the flow passage as the ball is rotated, and a tubing relief slot is formed in the wall of the ball opposite the cutting means and opens to the exterior thereof. The relief slot receives the tubing during the cutting operation, and prevents it from being placed in double shear, thereby significantly reducing the amount of torque the ball need be subjected to effect such cutting. Preferably the cutting means comprises at least one tooth with sharp edges to either side to cause piercing of the tubing wall as shearing thereof is initiated. Also the configuration of the relief slot, in a preferred form, includes diverging wall surfaces to guide the tubing into the slot as the ball rotates toward the closed position. In combination with the foregoing may be provided a hydraulically operable means that is remotely and selectively controlled for positively assisting in causing rotation of the ball and shearing or cutting of the coiled tubing in two.

The present invention has other objects, features and advantages that will become more clearly apparent in connection with the following detailed description of a preferred embodiment, taken in conjunction with the appended drawings, in which:

FIGS. 7 and 8 are quarter section views of the apparatus showing, respectively, the opening of the ball valve assembly and the subsequent opening of the flapper valve assembly.

Figure 1:
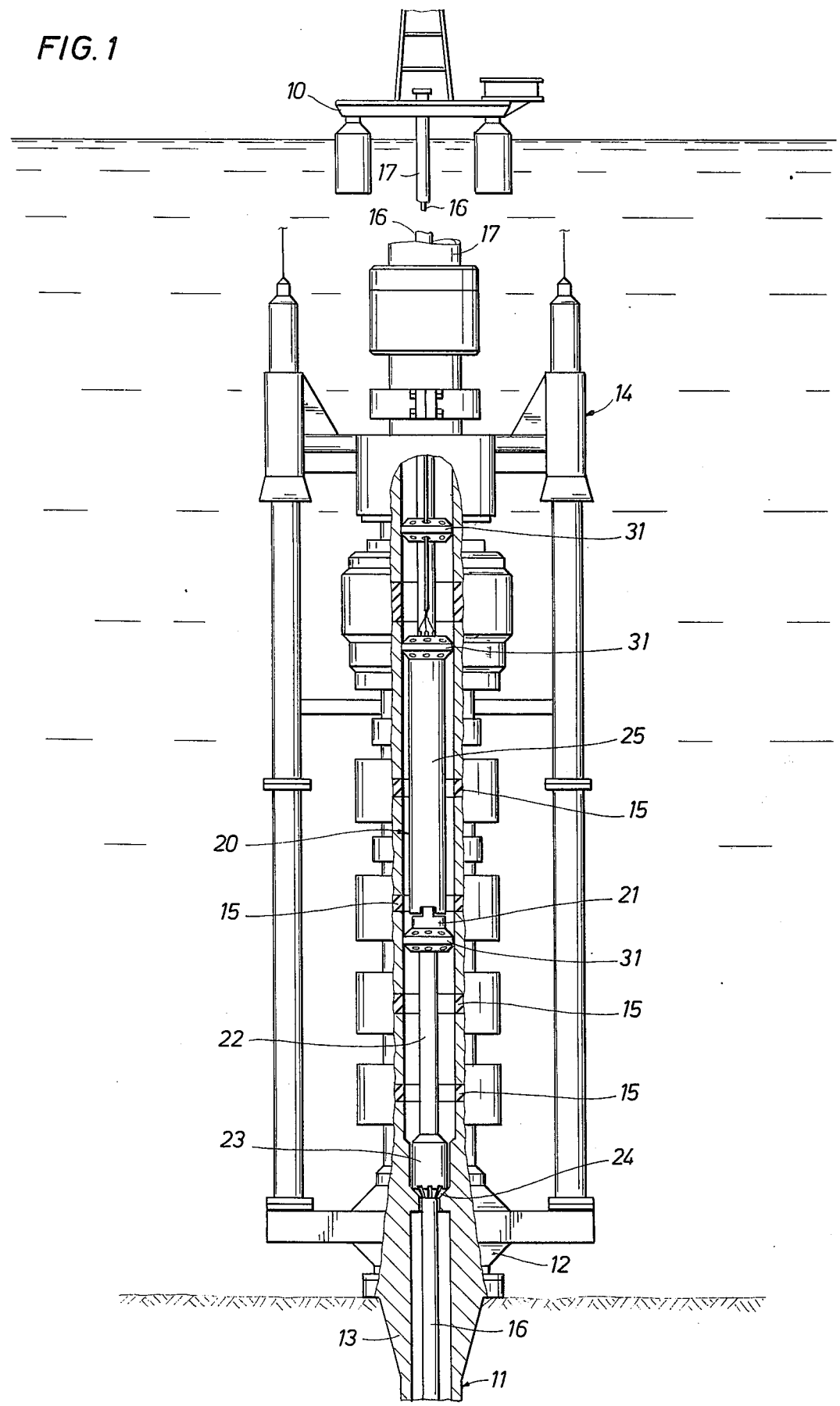
FIG. 1 is a schematic view of an offshore well undergoing a workover operation conducted from a floating vessel, utilizing a subsea control valve apparatus constructed in accordance with the principles of the present invention.

Referring initially to FIG. 1, there is shown somewhat schematically a floating or semisubmersible drilling vessel 10 stationed over an offshore well 11. A casing head 12 is fixed to the top of the well casing 13 and is connected to a blowout preventer stack 14 that has a plurality of pairs of laterally movable rams 15 adapted when closed to shut off the annulus between the casing 10 and a production tubing 16 or other conduit extending into the well. A marine riser 17 is connected in a conventional manner to the top end of the blowout preventer stack and extends upwardly to a point above the water surface where it may be coupled to the vessel by a typical riser tensioning system. Various hydraulic lines and the like extend from onboard control panels down to the blowout preventer stack in order to provide for hydraulic actuation of the various components thereof in a well known manner.

Inside the BOP stack 14 is positioned a control valve apparatus 20 constructed for the most part in accordance with the teachings of U.S. Application Ser. No. 462,829, Young, filed Apr. 22, 1974 and now U.S. Pat. No. 3,967,647. The apparatus is connected into the flow conduit 16 leading from the surface downward to the well formation, and includes a valve section 21 connected by a slick joint 22 to a fluted hanger flange 23 which is sized and arranged to rest on a shoulder surface 24 at the lower end of the stack 14. The lower rams of the BOP provide for closure around the slick joint 22, whereas the hanger flange 23 supports the pipe string 16 extending into the well. Releasably connected to the top of the valve section 21 is a hydraulically operated control unit 25 that incorporates mechanisms which function to open one or more valves within the section 21 in response to the application of fluid pressure to control lines extending upwardly alongside the pipe string 21 to the vessel 10, as well as a releasable connector that enables selective connection and disconnection of the unit 25 to and from the valve section 21. A plurality of guide flanges 31 serve to center the assembly 20 within the bore of the BOP stack 14 in a typical manner.

Figure 2A:
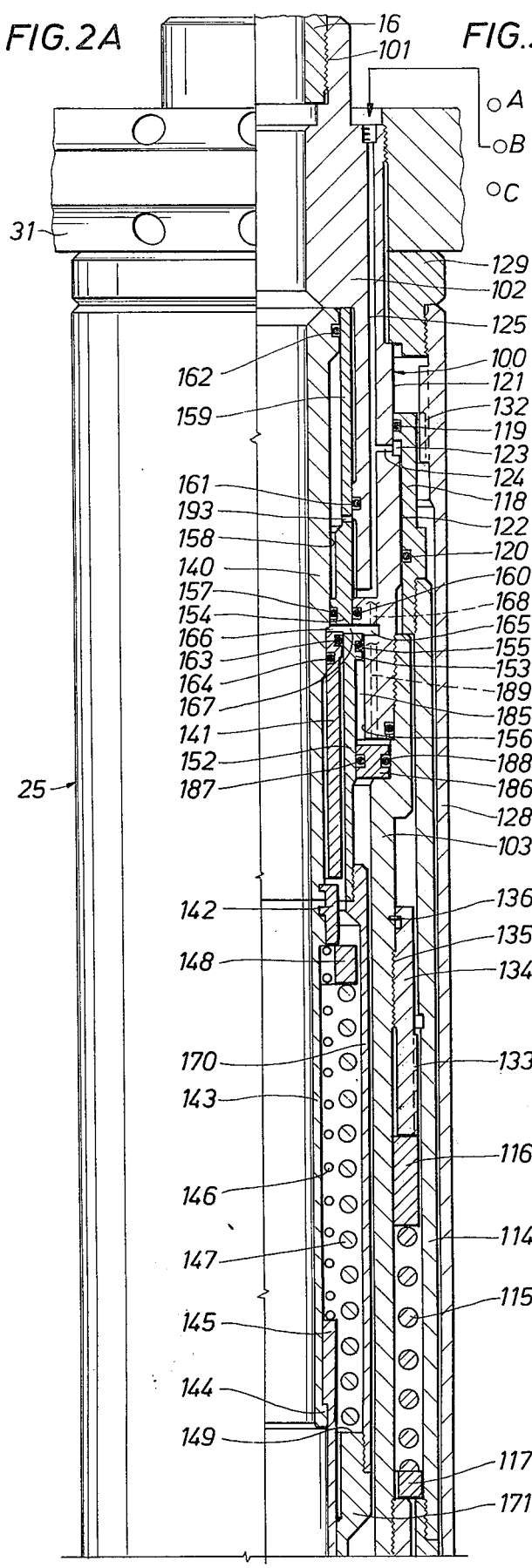
FIGS. 2A-2B are longitudinal sectional views, with portions in side elevation, of the control valve apparatus with the valve section and the control unit releasably connected together.
Figure 2B:
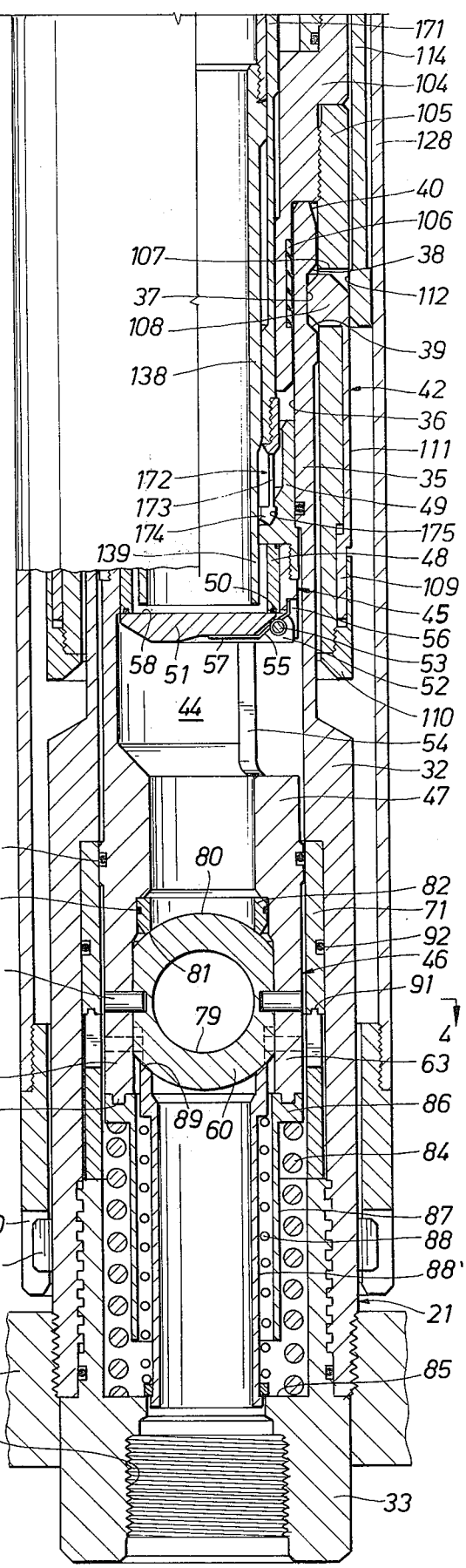

Referring now to FIGS. 2A and 2B for enlarged detail of the construction of the valve section 21 and the control unit 28, a valve body 32, generally tubular in form, includes a coupling 33 at its lower end having threads 34 adapted for connection to the slick joint 22. The upper end of the valve body 32 is constituted by a latch extension 35 having an internal seal bore 36 and an external latch or detent groove 37 extending therearound. The upper and lower walls 38 and 39 of the groove 37 are inclined in opposite directions, and the upper outer surface 40 of the extension 35 also is inclined downwardly and outwardly for cooperation with a plurality of latch dogs 42 as will subsequently be described.

The valve body 32 has a throughbore 44 providing a fluid passage. The passage is adapted to be opened and closed by an upper valve assembly 45 and a lower valve assembly 46 that are carried by a tubular cage 47 which is slidable vertically within limits within the bore 44 of the valve body 32. The upper valve assembly 45 includes a valve seat ring 48 fixed within the cage 47 below a connector head 49 and carrying a downwardly facing seal ring 50. A "flapper" valve element 51 in the form of a disc has an outwardly extending ear 52 that is pivoted by a transversely extending pin 53 to the cage 47 above a window 54 within which the disc is disposed when it swings downwardly to open position. A hinge spring 55 surrounds a portion of the pin 53 and has tangs 56 and 57 respectively engaging the cage 47 and the lower surface of the valve element 51 in such a manner that the spring continuously urges the element to swing upwardly to a closed position where its outer peripheral surface 58 engages the seal ring 50. Additional seals such as O-rings, are provided on the seat ring 48 and the extension 35 to prevent leakage past the valve assembly 45 in the closed position.

Figure 3:
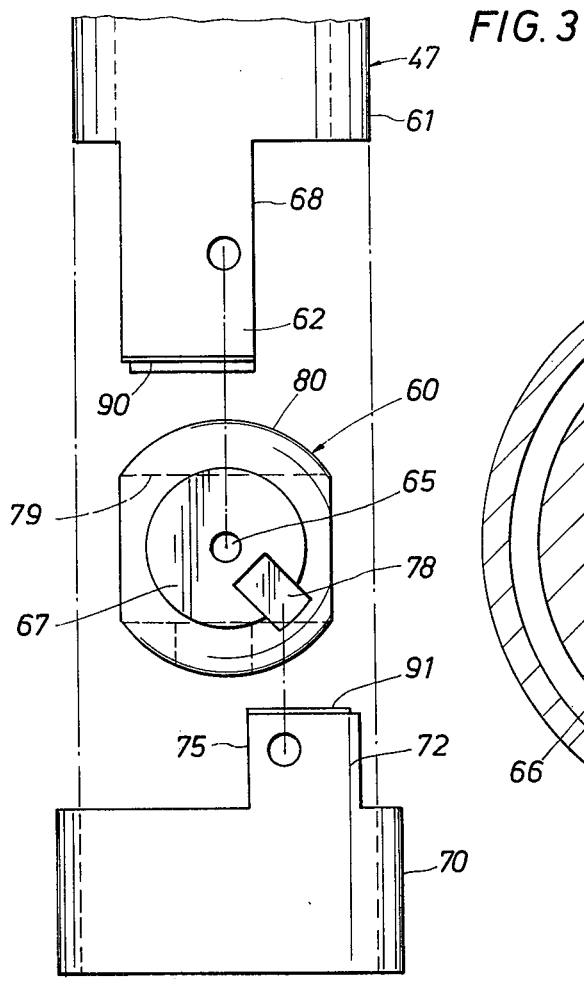
FIG. 3 is an exploded view of the principal parts of the ball valve assembly of FIG. 2B.
Figure 4:
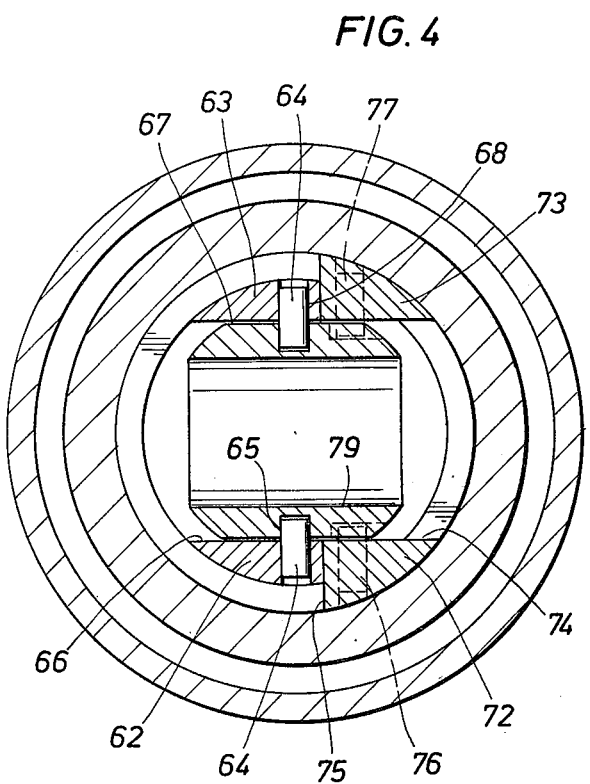
FIG. 4 is a cross-sectional view taken along lines 4—4 of FIG. 2B to further illustrate the ball valve assembly.

The lower valve assembly 46 as shown in some detail in FIG. 2B and more specifically in FIGS. 3 and 4, includes a ball valve element 60 that is rotatably mounted on the lower end portion 61 of the valve cage 47 for movement between open and closed positions with respect to the flow passage 44. The lower end portion 61 is formed with depending legs 62 and 63, each of which is interfitted with a trunnion pin 64 that is received within an aperture 65 on the side of the ball element 60. The inner surface 66 of each leg 62 or 63 is formed parallel to the flat side walls 67 of the ball and at right angles to its axis of rotation, whereas the flat end wall 68 of each leg is laterally offset from the rotation axis. The lower portion 61 is sized and arranged to fit slidably within the bore of a sleeve 70 that is fixed within valve body 32 below a tubular bushing 71 and the upper end of the coupling sub 33. The sleeve 70 has upwardly projecting bosses 72 and 73 formed on its upper end, with each boss having a flat inner wall 74 formed in the same plane as the wall 66 of a respective leg 62 or 63, and a flat outer face 75 against which the outer face 68 of a leg is slidable. Oppositely disposed pins 76 and 77 are fitting within holes in the bosses 72 and 73 and extend into eccentrically disposed grooves 78 formed in peripheral surfaces on the ball 60 when the parts are assembled. The pins 76, 77 and the grooves 78 are arranged such that when the cage 47 is in its upper position within the valve body 32, the throughbore 79 of the ball 60 is at right angles to the flow passage 44 where its upper peripheral surface 80 engages the spherical valve seat surface 81 of a seat ring 82 carried by the cage 47. On the other hand, when the cage 47 is shifted downwardly within the valve body 32, the pins 76 and 77 cause the ball 60 to rotate 90° to a position where the bore 79 of the ball is vertically aligned with the central flow passage 44 of the valve body. A coil spring 84 that reacts between an inwardly extending shoulder 85 on the coupling member 33 and the outwardly extending flange 86 at the top of a tube 87 which engages the lower end of the cage 47 biases the cage upwardly within the valve body 32 so that normally the ball element 60 is rotated to the closed position. In addition, a relatively light spring 88 pushes upwardly on a tubular follower 88′ having an upper end surface 89 in engagement with the periphery of the ball 60 to provide for smooth flow of fluids therethrough and to isolate the rotating mechanism from sand or other debris in the fluids. Accurate alignment of various parts is maintained by outstanding annular ribs 90 and 91 that are interfitted within companion grooves as shown to ensure against any binding of the ball during operation. Seal rings 92, 93 and 94 prohibit fluid leakage upwardly past the ball element 60 in the closed position.

The control unit 25 as shown principally in FIGS. 2A and 2B includes a tubular housing member 100 that is connected by threads 101 at its upper end to the pipe string 16 extending upwardly to the drilling vessel 10. The housing member 100 may be constituted by several sections that are threadedly connected together, including a ported upper sub 102, an intermediate sub 103, a lower seal sub 104 and an outer connector sub 105. The seal sub 104 fits within the seal bore 36 of the valve body 32 and carries a packing assembly 106 which provides a fluid tight connection. The connector sub 105 has a plurality of radially directed openings 107 through the wall thereof, which are sized and arranged to receive the enlarged head portions 108 of a like number of the circumferentially spaced latch dogs 42. The lower end portion 109 of each latch dog 42 is retained by a collar 110 screwed onto the lower end of the sub 105, and the mid-sections 111 of each latch dog are laterally flexible to the extent that the head portions 108 can occupy inner positions as shown where they engage the detent groove 37, and outer positions where they are released therefrom. Normally however, the head portions 108 are held inwardly by an annular locking surface 112 on an elongated, tubular latch mandrel 114 which is movable relatively along the housing member 100 between a lower position as shown, and an upper position where the locking surface 112 is disposed above the head portions. A coil spring 115 reacts between stop rings 116 and 117 to bias the latch mandrel 114 toward the lower position. A piston head 118 is connected to the upper end of the mandrel 114 and carries seal rings 119 and 120 in sealing and sliding engagement with respective external surfaces 121 and 122 of the housing member 100. Inasmuch as the upper surface 121 is of a lesser diameter than the lower surface 122, an annular chamber 123 is formed with a transverse dimension such that fluid pressure can force the mandrel 114 upwardly along the housing member 100 for release of the latch dogs 42. A control fluid under pressure is communicated to the chamber 123 via a port 124 that communicates with a vertical passage 125 extending to the top surface of the housing member 100 where it is appropriately connected to a control line B extending upwardly to the onboard control panel.

An elongated protector sleeve 128 is fixed to a collar 129 near the upper end of the housing member 100 and extends downwardly to the vicinity of the valve body 32 in order to shield the latch mandrel 114 from being accidentally driven upwardly to the latch releasing position due to engagement with an obstruction as the assembly is being lowered through the riser 17 and into the BOP stack 14. The lower end of the protector sleeve 128 has upwardly extending slots 130 formed therein which engage a plurality of outwardly directed lugs 131 on the valve body 32 to prevent relative rotation. The latch mandrel 114 is corotatively secured to the protector sleeve 128 by interengaged splines and grooves 132 on the piston head 118 and the upper end of the mandrel respectively. Moreover, the latch mandrel 114 is splined at 133 near its midsection to a jack sleeve 134 that is threaded at 135 to the housing member 100. With the elements 128, 114 and 134 thus held against rotation in the BOP stack 14, it is possible to rotate the housing member 100 relative thereto and, after disrupting one or more shear rings 136 or the like at a predetermined torque load, to mechanically feed the latch mandrel 114 upwardly to the released position.

The control unit 25 further includes instrumentalities adapted for actuation of the upper and lower valve assemblies 45 and 46. To control the opening of the upper assembly 45, an elongated actuator sleeve 138 may be shifted downwardly from the position shown in FIG. 2B to a lower position where the end portion 139 thereof projects through the seat ring 48, thereby swinging the flapper element 51 to the open position within the window 54 and retaining it in such position. To actuate the lower valve assembly 46 it is necessary to shift the valve cage 47 downwardly within the valve body 32 to cause pivotal rotation of the ball to open position. Downward movement of the actuator sleeve 138 is accomplished in response to a hydraulically operable piston means constituted by an elongated tube 140 that carries a sleeve piston 141 located above a drive nut 142 that connects the tube to a depending tubular extension 143. The lower end portion of the extension 143 and the upper end portion of the actuator sleeve 138 are provided with opposed shoulders 144 and 145, one above the other, and are slidably arranged to telescope somewhat in lost-motion. A coil spring 146 presses upwardly on the drive nut 142 and downwardly on the upper end face of the actuator sleeve shoulder 144 and thus urges the members in opposite longitudinal directions. A second coil spring 147 is arranged to react between a stop ring 148 that abuts the nut assembly 142, and an inwardly directed shoulder 149 on a tubular member 171 that comprises a part of the ball valve actuator mechanism to be described below. The spring 147 presses the hydraulically operable piston means upwardly within the housing member 100 and tends to position it such that the flapper valve element 51 is automatically closed against the seat ring 48 by the hinge spring 55.

The ball valve actuator assembly that functions to shift the cage 47 downwardly within the valve body 32 includes an elongated piston member 152 having oppositely directed seal flanges 153 and 154, with the flange 153 being located adjacent the upper end of the sleeve piston 141, and the inwardly directed flange 154 being located thereabove. An O-ring seal 155 slidably engages an internal cylinder surface 156 of the housing member 100, and a seal 157 on the flange 154 engages an external surface 158 of the tubular member 140. An upper portion 159 of the member 152 is sealed with respect to the housing member 100 by rings 160 and 161, and with respect to the tubular member 140 by a seal ring 162 at the upper end thereof. In addition, the sleeve piston 141 that constitutes a part of the flapper valve actuator assembly carries seal rings 163 and 164, so that the arrangement provides annular chamber spaces 165 and 166 that are communicated with each other by one or more radially directed ports 167 extending through the wall of the member 152 between the seal flanges 153 and 154. The chamber spaces 165 and 166 are adapted to be supplied with a control fluid under pressure by a vertical port 168 leading to the top of the housing member 100 where it is connected to a control line A extending upwardly to the surface. Pressurization of the control line A will thus tend to force both the sleeve piston 141 and the tubular member 152 downwardly within the housing member 100.

The lower end of the member 152 is threadedly connected to an intermediate sleeve 170 which surrounds the extension 143 in laterally spaced relation, and which is, in turn, connected to a drive sleeve 171 having a collet 172 at its lower end. The collet 172 has a plurality of circumferentially spaced spring fingers 173 with lower head portions 174 shaped and arranged to engage a recess 175 in the connector head 49, with the lower face inner of each head being inclined upwardly and inwardly, and the lower outer surface of each head 174 being inclined upwardly and outwardly. Moreover, the upper outer surface of each head 174 is inclined outwardly and downwardly. The recess 175 is formed with companion shaped surfaces, whereby it will be apparent to those skilled in the art that the heads 174 can be forceably engaged with the recess 175 due to the lateral flexibility of the spring fingers and the camming action of the above-described surfaces. Once the heads 174 are engaged with the recess 175, it is possible to transmit longitudinal force therethrough to shift the cage 47 downwardly within the valve body 32 due to the fact that the lower inner inclined surfaces will tend to retain the heads within the recess. On the other hand, a predetermined upward force on the latch fingers 174, determined by their resistance to inward flexure, and the angles of the upper inclined surfaces is required to release the heads 174 from the groove or recess 175 in the connector head 49.

It thus will be appreciated that downward movement of the drive sleeve 171 due to pressurization of the chamber space 165 via the control line A is transmitted by the collet 172 to the valve cage 47 and causes it to move downwardly also. Such downward movement, in turn, causes the ball valve element 60 to rotate to the open position as the ball closure spring 84 is compressed. The same hydraulic pressure within the chamber space 166 forces the sleeve piston 141 and various parts coupled thereto downwardly within the housing member 100, and when the cage 47 reaches the lower limit of its movement within the valve body 32 such parts continue to move downwardly, thus compressing the flapper opening spring 146 as well as the outer return spring 147. The opening spring 146 thus is armed and able to push the actuator sleeve 138 downwardly through the seat 48 and cause the flapper element 51 to swing to open position.

A release of pressure applied to the control line A will enable the outer return spring 147 to reposition the piston assembly 141 and the actuator sleeve 138 in their upper position relative to the tubular member 152, thus withdrawing the lower portion 139 of the sleeve from within the seat ring 48 and enabling automatic closure of the flapper element 51. Moreover, the ball valve closing spring 84 shifts the valve cage 47 upwardly within the valve body 32, repositioning the tubular member 152 and causing the ball valve element 60 to rotate to closed position. To provide for a hydraulic assist to closure of the ball element 60, in case, for example, it is necessary in an emergency to cut wireline, cable or coiled tubing extending therethrough and into the well, an annular chamber 185 is formed below the seal flange 153 on the tubular member 152 as shown in FIG. 2A, the lower end of the chamber being defined by a fixed ring 186 on the housing member 100 carrying seals 187 and 188. A third vertical passage 189 connects the chamber 185 with a control line C extending upwardly to the surface, so that pressurization of the chamber forces the tubular member 152 upwardly within the body member 100. Such force is transmitted to the cage 47 by the collet 172, and supplements the upward force of the ball closure spring 84. The combination of forces is ample to cause the ball 60, as an edge formed at the intersection of the wall of the bore 79 with the outer peripheral surface 80 passes the edge of the valve seat 82, to provide a cutting action.

Figure 5:
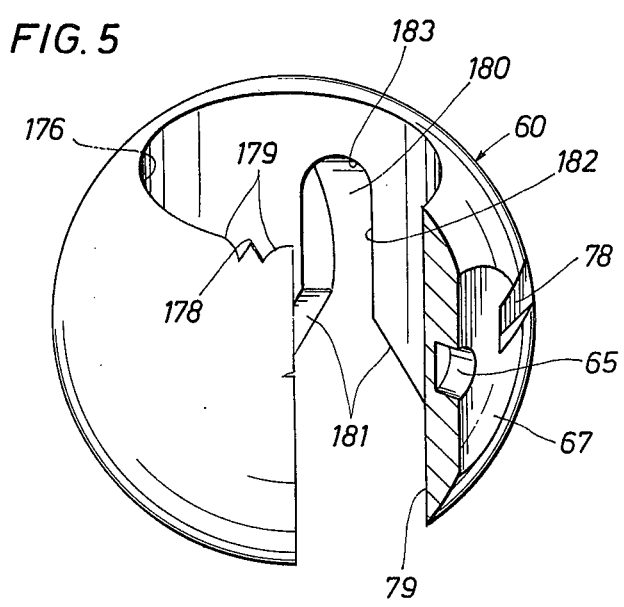
FIG. 5 is an enlarged isometric view of the ball valve element showing the cutting edge and the relief slot.

Further details of the ball valve element 60 constructed in accordance with the present invention are shown in FIG. 5. As viewed from the right of this Figure, it will be apparent that the ball element 60 rotates in a clock-wise direction during closing movement to cause a circular edge surface 176 to traverse the inner edge 177 of the seat ring 82. The edge surface 176 is relatively sharp to provide shearing forces to any object extending through the ring 82 and the bore 79 of the ball element when closure is effected. To enhance the shearing action, it is preferred to provide a tooth 178 located on the edge 176 at a right angle to the axis of rotation of the ball element 60, with sharpened surfaces 179 to either side. The tooth 178 functions to pierce the object to initiate the shearing action.

To prohibit an object such as coiled tubing from being placed in double shear during cutting thereof, a relief slot 180 is provided through the wall of the ball element 60 on the opposite side from the tooth 178. The slot 180 is opened to the lower side of the ball element 60, and preferably is provided with upwardly converging lower wall surfaces 181 to guide the tubing into the upper portion 182 of the slot. The lateral spacing between the side walls of the upper portion 182 of the slot 180 are dimensioned to be only slightly larger than the o.d. of the tubing to be cut (for example about 1⅛ inches for cutting 1 inch o.d. tubing), whereby the tubing is positioned as the ball rotates toward closed position directly opposite the tooth 178. The upper end surface 183 of the slot 180 would be formed on a 9/16 inch radius in the example given above axis of the ball element 60 so that the surface 183 does not contact the tubing during the cutting operation to be described in further detail herein.

In operation, the subsea control valve apparatus 20 is installed in the pipe string, and the hydraulic control lines A, B, and C from the control panel and reel onboard the vessel 10 are connected to the upper end of the housing member 100. The apparatus 20 is then lowered through the riser 17 until the assembly is landed in the blowout preventer stack 14 at the sea floor, and the hanger flange 23 abuts against the hanger shoulder 24. The various parts and subassemblies are in the positions shown in FIGS. 2A-2B during lowering, that is to say with the valve cage 47 in the upper position where the ball element 60 is closed and with the actuator sleeve 138 above the valve seat 48 so that the flapper element 51 is closed. After the apparatus 20 is landed, the lower ones of the pipe rams 15 are closed around the slick joint 22 to seal off the annulus between the pipe 16 and the well casing 13.

When it is desired to open the valve assemblies 45 and 46, the line A is pressurized from the onboard control panel. The corresponding pressure in the chamber spaces 165 and 166 acts downwardly on the resultant area of the outer piston assembly 152, as well as on the inner piston assembly 141, causing the assemblies to shift downwardly within the housing member 100, typically in unison. Such downward movement causes corresponding downward movement of the valve cage 47 within the valve body 32 and rotation of the ball valve element 60 to open position as shown in FIG. 7. When the cage 47 reaches the limit of its downward movement defined by full compression of the coil spring 84, the inner piston assembly 141 will continue to move downwardly as the coil spring 146 that reacts between the piston assembly and the actuator sleeve 138 is compressed and loaded, as in the return spring 147. Then pressures can be equalized, if necessary, across the closed flapper valve element 51 to enable the actuator sleeve 138 to be advanced by the coil spring 146 through the valve seat 48, pushing the element 51 to full open position within the window 54 as shown in FIG. 8. The outer locking surface 192 on the actuator sleeve 138 is positioned behind the heads 174 of the collet connector 172 to positively lock the heads in engagement with the detent groove 175. As long as pressure is maintained on the line A, the upper and lower valve assemblies 45 and 46 will remain open to the flow of production fluids from the well via the pipe string 16.

To close the valve assemblies 45 and 46, pressure in the line A is bled off. The ball valve closure spring 84 then shifts the cage 47 upwardly within the valve body 32, causing the ball 60 to be rotated to closed position as shown in FIG. 2B. Moreover, the flapper valve closure spring 147 elevates the inner piston assembly 141 and the actuator sleeve 138 to their initial upper positions where the lower end portion 139 of the actuator sleeve is withdrawn from through the seat ring 48, enabling the hinge spring 55 to automatically close the flapper element 51. Accordingly, the production pipe 16 is shut off against any upward flow of fluids therethrough.

Figure 6:
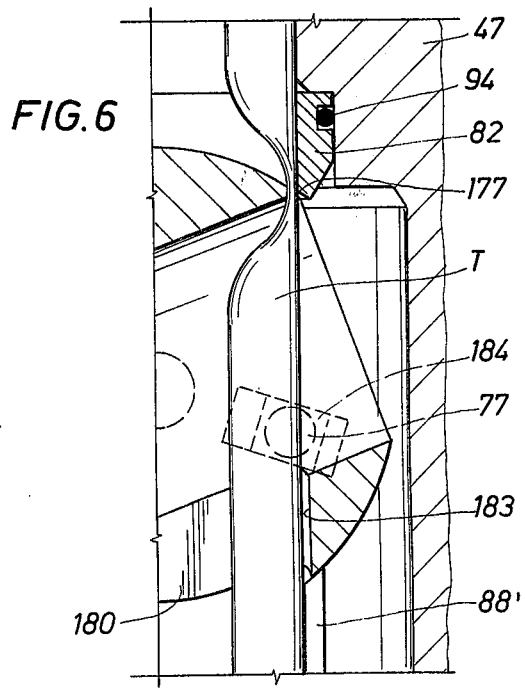
FIG. 6 is a fragmentary cross-sectional view which illustrates the operative position of the ball element during cutting of coiled tubing.

In the event that coiled tubing is suspended in the well for performing various workover services or the like, and an emergency condition dictates that the well be shut-in before there is time to retrieve the tubing to the vessel 10, the lower valve assembly 46 can be used to cut the tubing as follows. The line C is pressurized from the surface to a value in excess of the pressure being applied to the line A. The pressure differential acts on the lower exposed face of the seal flange 153 to exert upward force on the drive sleeve 171 which is transmitted to the cage 47 by the collet 172. The combination of the hydraulic force and the force of the return spring 84 is applied in an upward direction to the cage 47 to cause the cage to shift upwardly and the ball element 60 to rotate toward the closed position. If desired, a pressure regulator valve (not shown) may be connected at the surface in the line A to enable a maximum differential pressure to be developed across the seal flange 153. The locking surface 192 on the flapper actuator sleeve 138 remains inside the collet heads 175 to prevent release of the collet 172 during cutting operation, thereby enabling greater torque to be applied to the ball 60 than would otherwise be available during an unlocked, mechanical release thereof. As the ball element 60 rotates in the clockwise direction as viewed from the right of FIG. 5, the tubing T is guided by the inclined slot surfaces 181 into the relief slot 180 and positioned opposite the tooth 178. As the ball continues to rotate, the tubing T is collapsed against the side of the seat ring 82 as shown in FIG. 6, whereupon the tooth 178 at least partially pierces the wall of the tubing to initiate cutting thereof by first the sharp edge surfaces 179 to either side of the tooth, and then the edge surfaces 176 as they pass the edge 177 of the seat ring 82. At all times during the cutting operation, the relief slot 180 enables the tubing T below the cut to be suspended vertically in the flow passage 44, whereby the tubing is not subject to double shear as the ball rotates. This lessens significantly to total amount of torque that is required to be applied to the ball element 60 to cause cutting of the tubing, so that the combination of the hydraulic force applied positively to the drive sleeve 171 and the force of the return spring 84 is amply adequate for the purpose. If desired, the eccentric force applied to the ball element 60 by the pins 76 and 77 may be distributed over the flat side walls of the grooves 78 by rectangular slide bushings 184 mounted rotatably on the inner end of each pin as shown in phantom lines in FIG. 6.

After the cutting operation is completed, the cut tubing between the ball element 60 and the surface can be rapidly removed. The pressures in the lines A and C are bled off allowing the return spring 147 to reposition the operator mandrel 138 above the flapper valve seat 48, which permits the flapper valve 51 to close and removes the locking surface 192 from behind the collet heads 174 so that the collet 172 may be released. Both the flapper valve 51 and the ball element 60 are closed against the respective seat rings 48 and 82 to prevent flow from the well.

To release the control unit 25 from the valve assembly 21, the line B is pressurized to apply upward force to the piston head 118 at the upper end of the latch mandrel 114. The resulting force overcomes the bias of the coil spring 115 and causes the mandrel 114 to shift upwardly to a position where the locking surface 112 is above the latch heads 108. Then the control unit 25 is pulled upwardly by the pipe string 16, causing the heads 108 to be cammed outwardly from the detent groove 37 by the inclined surface 39. In addition, the collet heads 174 are forceably released from the detent groove 175 in the connector head 175. The entire control unit 25 then can be retrieved to the surface leaving the valve section 21 within the blowout preventer stack 14 with both of the valve assemblies 45 and 46 in closed condition. The valve body 32 is of such short length that at least the upper blind pair of the rams 15 of the preventer can be closed against one another to ensure complete control of the well.

To reconnect the control unit 20 with the valve body 32, a procedure similar to the disconnection procedure described above is used. The control unit 25 is lowered through the riser 17 with the control line B under pressure to hold the latch mandrel 114 in the upper position. When the latch heads 108 encounter the outer inclined surface 40 of the valve body 32, they are cammed outwardly thereby and then snap into the detent groove 37. The housing member 100 can be rotated somewhat to ensure that the slots 130 on the protector sleeve 128 are properly engaged with the lugs 131 on the valve body 32, and then the pressure in the line B is bled off. The latch mandrel 114 is shifted downwardly by the coil spring 115, whereby the latch heads 108 are locked within the detent groove 37 by the locking surface 112. As the above connection is made, the collet 172 also couples with the detent groove 175 of the connector head 49 due to the camming action of the surfaces 178 and 179.

Should it become necessary to effect a mechanical release of the latch dogs 42 in case, for example, there is a lack of hydraulic power or leakage of control fluid, the pipe 16 can be rotated at the surface to cause corresponding rotation of the housing member 100. When the shear ring 136 is disrupted at a predetermined torque value, continued rotation causes the jack sleeve 134 to lift the latch mandrel 114 upwardly to the released position.

It now will be recognized that a new and improved subsea master or control valve has been disclosed herein having the capability for cutting coiled tubing in two in case of emergency. Of course the apparatus also can be used to cut wireline or cable. In either case the apparatus shuts off flow from the well after the cutting operation has been concluded. Since certain changes or modifications may be made in the disclosed embodiment without departing from the inventive concepts involved, it is the aim of the appended claims to cover all such changes or modifications falling within the true spirit and scope of the present invention.

We claim:

1. Valve apparatus comprising: a tubular valve body having an axially extending flow passage; spherical annular seat means surrounding said flow passage; a ball element in said valve body and having a throughbore aligned with said flow passage in the open position and an outer spherical surface engageable with said seat means in the closed position; and means for rotating said ball element between open and closed position; said ball element having cutting means cooperable with said seat means for cutting in two a tubular member extending through said bore, and relief means for preventing a tubular member from being placed in double shear during cutting thereof by said cutting means.

2. The apparatus of claim 1 wherein said cutting means comprises at least one upstanding tooth adapted to pierce the wall of a tubular member after contact therewith.

3. The apparatus of claim 2 wherein said cutting means further comprises sharp edge surfaces to either side of said tooth.

4. The apparatus of claim 1 wherein said relief means comprises an elongated slot formed in the wall of said ball element and having one end opening to the exterior of said ball element generally opposite said cutting means.

5. The apparatus of claim 4 wherein said open end is defined in part by converging guide surfaces for guiding a tubular member into said relief means during rotation of said ball element.

6. The apparatus of claim 4 wherein said cutting means comprises at least one upstanding tooth adapted to pierce the wall of a tubular member after contact therewith.

7. The apparatus of claim 6 wherein said cutting means further comprises sharp edge surfaces to either side of said tooth.

8. The apparatus of claim 1 wherein said rotating means includes biasing means urging rotation of said ball element to said closed position, and further comprising hydraulically operable means for assisting said rotating means in closing said ball element and in cutting a tubular member during closure thereof.

9. Valve apparatus comprising: a tubular valve body having an axially extending flow passage; spherical annular seat means surrounding said flow passage; a ball element mounted in said valve body and having a throughbore aligned with said flow passage in the open position and an outer spherical surface engageable with said seat means in the closed position; means for rotating said ball element between open and closed position including eccentric means on said valve body and means for shifting said ball element longitudinally of said valve body and said eccentric means to cause rotation of said ball element relative to said seat means; said ball element having cutting means at the intersection of said bore with said outer spherical surface for cutting in two a tubular member extending through said bore, and relief means in said ball element generally opposite said cutting means and said spherical outer surface for preventing a tubular member from being placed in double shear cutting thereof by said cutting means.

10. The valve apparatus of claim 9 wherein said eccentric means comprises oppositely oriented pins fixed to said body and extending into transversely disposed slots on either side of said ball element, said slots having flat side wall surfaces, and bushing means on the inner end of each pin havng flat side wall surfaces slidable against the side wall surfaces of a respective slot during rotation of said ball element.

11. The apparatus of claim 9 wherein said shifting means includes spring means continuously urging rotation of said ball element relative to said seat means toward closed position.

12. The apparatus of claim 9 wherein said rotating means includes first hydraulically operable means subject to the pressure of fluid from a control line for urging shifting of said ball element relative to said seat means toward open position.

13. The apparatus of claim 12 further including second hydraulically operable means subject to a control fluid pressure for assisting in shifting of said ball element longitudinally of said valve body to cause rotation of said ball element toward closed position.

14. The apparatus of claim 9 wherein said cutting means comprises an upstanding tooth and sharp edge surface extending to either side of said tooth.

15. The apparatus of claim 9 wherein said relief means comprises an elongated slot formed in the wall of said ball element and having one end opening to the exterior thereof.

16. The apparatus of claim 15 wherein said open end is defined in part by converging guide surfaces for guiding a tubular member into said relief means in response to rotation of said ball element.

* * * * *